United States Patent [19]
Heine et al.

[11] Patent Number: 6,126,819
[45] Date of Patent: Oct. 3, 2000

[54] APPARATUS FOR THE TREATMENT OF LIQUIDS CONTAMINATED BY FOREIGN SUBSTANCES

[75] Inventors: Wilhelm Heine, Hamburg, Germany; Robert Rautenbach, Vaals, Netherlands; Klaus Vossenkaul, Roetgen, Germany

[73] Assignee: Rochem RO-Wasserbehandlung GmbH, Hamburg, Germany

[21] Appl. No.: 09/052,487

[22] Filed: Mar. 31, 1998

[30] Foreign Application Priority Data

Mar. 13, 1998 [DE] Germany ............................ 198 11 945

[51] Int. Cl.[7] ........................... B01D 69/10; B01D 63/02; B01D 65/02
[52] U.S. Cl. ........................... 210/139; 96/8; 210/321.72; 210/321.8; 210/321.89; 210/412; 210/500.23
[58] Field of Search .................................. 210/139, 321.6, 210/321.69, 321.78, 321.79, 321.8, 321.88, 321.89, 321.9, 321.72, 323.1, 323.2, 340, 410, 412, 483, 486, 497.01, 637, 406, 416.1, 456, 500.23; 96/7–9

[56] References Cited

U.S. PATENT DOCUMENTS

| | | |
|---|---|---|
| 3,228,877 | 1/1966 | Mahon . |
| 3,400,825 | 9/1968 | Shippey ................................ 210/321.9 |
| 3,598,241 | 8/1971 | Vondaracek et al. ................. 210/321.9 |
| 4,886,601 | 12/1989 | Iwatsuka et al. ................... 210/500.23 |
| 4,961,760 | 10/1990 | Caskey et al. ..................... 210/500.23 |
| 5,024,762 | 6/1991 | Ford et al. ......................... 210/500.23 |
| 5,034,125 | 7/1991 | Karbachsh et al. ................ 210/500.23 |
| 5,328,610 | 7/1994 | Rogut ................................. 210/500.23 |
| 5,332,498 | 7/1994 | Rogut ................................. 210/500.23 |
| 5,470,469 | 11/1995 | Eckman ............................. 210/500.23 |

*Primary Examiner*—Joseph W. Drodge
*Attorney, Agent, or Firm*—Klaus J. Bach

[57] ABSTRACT

In an apparatus for the treatment of liquids including foreign substances, particularly municipal and commercial waste waters, comprising a membrane separating structure having membrane elements, an inlet for receiving the liquid to be separated and passing it past the membrane elements whereby a permeant portion of the liquid permeates through the membranes and a retent portion becomes enriched with the foreign substances, and outlets for discharging the permeant portion and the retent portion, the membrane elements are arranged so as to form together flow channels extending longitudinally through the apparatus and adapted to guide the liquid straight through the flow channels along the membrane elements.

19 Claims, 8 Drawing Sheets

APPARATUS FOR THE TREATMENT OF LIQUIDS CONTAMINATED BY FOREIGN SUBSTANCES

BACKGROUND OF THE INVENTION

The invention relates to a method of treating liquid including foreign substances, particularly municipal and commercial waste water, by means of a membrane separating apparatus including membrane elements wherein the liquid to be treated is admitted, by way of an inlet, to the admission side of the membrane apparatus and the retent with increased foreign substance concentration and the retent with increased foreign substance concentration and the permeant free of the foreign substances are conducted out of the apparatus through different discharge passages.

Such apparatus have been known for some time and are used in various separation processes for liquids including several components and also for gases. An important aspect in the separation of municipal and commercial waste waters by means of the type of apparatus described above is that the concentration of the substances to be removed can be increased in the retent to such a degree that they are present in a concentration which is optimal for the subsequent biological digestion process. To this end, it is necessary to retrieve the liquid component, that is, the water, from the medium to be separated in a single processing step with such a purity that it can be discharged as clean water suitable for other uses without further treatment. Another requirement for the operation of this type of an apparatus is that it uses relatively only a small amount of energy thereby providing for a good cost-utilization ratio.

The most recent state of the art apparatus of this type provide for satisfactory results with respect to the parameters given above. They are however subject to clogging and blockages during extended operation. The so-called cross-flow pipe systems which have a relatively high specific energy consumption are operating reliably even with a high content of solids in the raw water and with a high throughput, but systems with low specific energy requirements can operate only with relatively low throughput when the content of solids is relatively high. Particularly apparatus with high membrane densities exhibit a performance loss already with relatively low concentrations of solids in the raw water and they may completely fail inspite of periodic flushing of the membrane elements. As a result, the apparatus need to be disassembled frequently and tediously cleaned and re-assembled and installed into the cleaning system. The time intervals in which such cleaning procedures are required are different depending on the substance content of the medium to be separated and the type of substances, but in any case, they are too short for an effective and efficient cleanup operation of residential and commercial waste waters using apparatus of the above type known in the art.

The reason herefor is not only that the membrane elements are extremely vulnerable points of such apparatus, but also the way the media to be separated are conducted along and past the membranes generate problems. For such separation procedures, state of the art apparatus have been used wherein the membrane elements are disposed in a pressure-tight housing in the form of flat or plate-like elements and the medium to be separated is conducted through the housing of the apparatus along the membrane elements in a meander-like fashion from an inlet to a retent outlet. Also, the medium may flow past all the membrane elements in a parallel flow arrangement. The retent, which is enriched with the foreign substances leaves the apparatus and also the permeant, for example, clean water, leaves the apparatus housing by way of another, centrally arranged, outlet. Also, combinations of such apparatus are known in the art. For example, apparatus wherein part of the membrane elements are so arranged that the medium flows along the membrane walls wherein blocks of such parallel flow membrane elements are arranged in series.

All these apparatus have a disadvantage in that, because the flow through the apparatus must be redirected, they generate a relatively high hydrodynamic resistance. As a result, the medium must be admitted with a relatively high pressure in order to be able to flow past all the membrane elements. With the resulting relatively low flow speed of the medium to be separated the membrane elements can therefore easily be blocked by the foreign substances suspended in the medium.

It is the object of the present invention to provide an apparatus of the type referred to above which operates reliably and without blockages which would detrimentally affect operation, which can be easily disassembled and which is simple in its design and can be inexpensively operated.

SUMMARY OF THE INVENTION

In an apparatus for the treatment of liquids including foreign substances, particularly municipal and commercial waste waters, comprising a membrane separating structure having membrane elements, an inlet for receiving the liquid to be separated and passing it past the membrane elements whereby a permeant portion of the liquid permeates through the membranes and a retent portion becomes enriched with the foreign substances, and outlets for discharging the permeant portion and the retent portion, the membrane elements are arranged so as to form together flow channels extending longitudinally through the apparatus and adapted to guide the liquid straight through the flow channels along the membrane elements.

This apparatus includes a flow passage which extends essentially linearly through the hole apparatus from the inlet to the outlet so that all the membrane elements are concurrently contacted by the liquid medium to be separated. The liquid to be separated flows along the outside of the membrane.

The filtrate or permeant flows through the interior flow passage of the respective membrane element and is discharged therefrom. The arrangement of the apparatus according to the invention insures that all the membrane elements are concurrently contacted from all sides which enhances a permeation of the liquid part of the medium. Since the medium flows straight through the apparatus, that is, the medium to be separated is not conducted through winding passages the passages are not blocked and the membrane elements are not clogged by the solids carieed with the medium to be separated. Another advantage of the arrangement according to the invention is that, because the flow passages are linear, there is no need for spacing elements, guide elements or any other elements which would affect in any way the flow of the medium to be separated on its way through the apparatus. As a result, the apparatus is simple and inexpensive to make.

The pressure difference between the supply side of the raw medium to be separated and the filtrate or permeant side can be realized either by a vacuum generated at the permeant side or an excess pressure generated at the raw medium side or by a combination of the two. As a result of the essentially linear flow passages without any deflections, the hydraulic resistance for the medium passing through the apparatus is low. Consequently, the required pressure for conducting the raw medium through the apparatus is relatively low so that also the energy requirements herefor are low. The raw medium is the medium to be separated in accordance with the invention.

Finally, it is noted that the design of the apparatus according to the invention is simple so that it can be easily disassembled, cleaned and re-assembled even by inexperienced personnel.

In a preferred arrangement according to the invention, the membrane elements are so arranged that they enclose flow passages which have a cross-section of any suitable shape, for example, a polygonal shape or a circle.

It is however, particularly advantageous if the cross-section of the flow passages so formed is hexagonal whereby for the area in which the membrane elements are suitably mounted an optimal area utilization is possible.

In order to arranged the membrane elements in a way as referred to above, there is no particular need for any special design of the membranes themselves. Consequently, any suitable membrane elements can be used, for example, membrane elements of a pillow shape. These membranes which are known in art are also called pillow membranes or pocket membranes.

All three terms are synonymous for the particular type of membranes. Membrane pillows would have the advantage that they could form the side walls of a flow channel for example, a flow channel of hexagonal cross-section. No other membrane elements would be needed. One side of pillow membranes would be exposed to the flow in one channel whereas the opposite side of the pillow membrane would be exposed to the flow in the adjacent flow channel, that is, the pillow membrane element would form a side wall position of two adjacent flow channels. In this way, an optimal arrangement of this type of membrane elements could be provided for all the flow channels of the apparatus.

It is also advantageous to provide the membrane elements in the form of so-called hollow fiber membranes which, as such, are also known in the art. Those hollow fiber membranes which are available with various outer and inner diameters and which may be of various designs can be arranged longitudinally in the apparatus in a simple manner. They can also be arranged in various ways to form a flow channel, that is, a certain amount of hollow fiber membranes which are arranged side-by-side and possibly adjacent one another can provide for flow channels with any desired flow cross-sections. With hollow fiber membranes the interior of the hollow fibers form the space into which the permeant permeates through the walls of the hollow fiber membranes. The permeant can be discharged from the hollow fiber membrane through one end of the hollow fibers while the other ends of the fibers are closed.

The single membrane elements are not interconnected except for their mounting point to one of their ends, so that a linear flow channel formed by the membranes has no rigid side walls and accordingly is flexible. This substantially reduce the chances of the flow passages of the apparatus to become clogged. At the freely movable ends of the membrane elements which are not firmly mounted and which are closed which is disposed adjacent the exit for the concentrated medium fiber-like fibrous waste cannot result in blockages since they are stripped from the membrane element in the flow direction by the medium to be separated.

Although it is possible in principle to install the arrangement in any suitable manner in the flow path of the medium to be separated, it is for certain applications advantageous to provide a housing in which at least most of the membrane elements are disposed. Since it is desirable to operate the apparatus with little excess pressure of the liquid medium at the supply side and/or with a small vacuum at the permeant side, that is, with a relatively small pressure difference, the housing is not subjected to high pressures so that it can be made from inexpensive materials which are readily available as unfinished tubular products. Plastic materials are particularly suitable for making the housing, but also metallic materials could be used which, however, have to be selected so as to be compatible with the medium to be separated.

In another advantageous embodiment of the apparatus according to the invention, the membrane elements have their permeant discharge openings disposed in a closure element which is mounted in the housing, if necessary, in a pressure-tight fashion. In this arrangement, the closure element receives one end of all the membrane elements of the apparatus. As a result, all the membrane elements can be removed from the housing during disassembly in a single step and also returned together into the housing during reassembly. The membrane elements are so mounted to the closure element that the permeant can be discharged from the membrane elements in an absolutely pure form that is without any of the concentrated medium leaking into the permeant.

In still another advantageous embodiment of the apparatus, the closure element includes a permeant discharge passage which receives the permeant flowing from the membrane elements through their discharge openings and which conducts the permeant to a permeant discharge line.

Consequently, in this arrangement, the closure element serves not only to properly mount the membrane elements, but also as a means for collecting the permeant flowing from the permeant discharge openings of the membrane elements and for conducting the permeant to one or more permeant discharge openings which may also be disposed on the closure element.

In order to insure that the flow channels surrounded by the membrane elements are properly contacted by the liquid medium to be separated, the closure element includes preferably a plurality of passages for the liquid medium corresponding to the number of flow channels. The passages are in axial alignment with the flow channels and form an extension of the flow channels of the apparatus.

The passages are preferably polygonal in cross-section, for example, hexagonal, or they are circular depending on the cross-section of the flow channels between the membrane elements. However, the passages may also be for example, circular while the flow channels between the membrane elements are hexagonal. It is always the aim to provide the least possible hydrodynamic resistance for the liquid medium to be separated within the apparatus.

For manufacturing reasons, it is furthermore advantageous if the closure element comprises two parts, that is, a receiver part on which the membrane elements are mounted and a guide part which is connected to the receiver part and which guides the medium to be separated to the flow channels. Such a two part arrangement of the closure element facilitates also the provision of the permeant collecting passages or, respectively, the permeant discharge structure or of a plurality of permeant discharge structures. In addition, such a two-part arrangement facilitates the mounting of the membrane element for example by means of a casting resin into the closure element as it is known per se.

The same is true for the separately formed guide part of the closure element which facilitates the manufacture of the flow passages with cross-sections of any desired shape. The receiving part and the guide part of the closure element may be made of a casting resin or any suitable plastic material and after being shaped as desired are interconnected by cementing or by direct material jointure.

In order to insure that the membrane elements are mounted in the receiver part in a mechanically safe and pressure tight manner, it is advantageous to provide for the support of the membrane elements in the receiving part a hard-elastic connecting means and a soft elastic connecting means which permits some movability of the membrane elements adjacent the inside of the housing. In this way, a certain movement of the membranes during operation of the apparatus can be accommodated so that for example, upon admission of the medium to be separated to the apparatus, the membrane elements do not break and leakages are prevented. The outer soft elastic connecting means contributes to a proper mounting of the membrane elements in the receiving part but it also permits some transverse movability of the membrane.

In principle, the design and the operational functionality of the apparatus are independent of the way pressure is applied to the medium to be separated in order to cause it to flow through the apparatus and particularly through the membrane elements. This means that the apparatus can be operated by subjecting the medium to be separated to a pressure or the permeant to a vacuum. Different modes of operation are also possible with respect to the flow of the liquids through the apparatus. In principle, the apparatus could be operated with cross-flow operation wherein the liquid flows axially through the apparatus at high speeds or in a dead end mode wherein only as much raw water is supplied to the apparatus as permeant is removed. In a further advantageous mode of operation, the medium that is to be separated is pumped by a pump arranged in the flow path of the medium to be separated through the apparatus in a so-called semi-cross-flow process. In this case, the medium flow through apparatus is only relatively small. To enhance the separation process and accordingly the filtration performance in the semi-cross-flow process for example, a combination of pressure at the side of the medium to be separated and a vacuum at the side of the permeant is advantageous. With these possibilities, the apparatus according to the invention can be utilized universally, that is, for a large range of solids concentrations of a medium to be separated.

As already mentioned, the apparatus known in the art are subject to blockages and to the formation of clogging layers or other detrimental effects of the foreign material carried along with the medium to be separated. Such blockages and cloggings are prevented by the arrangement according to the invention to a large degree, but cannot be fully eliminated under certain rare conditions so that a detrimental effect on the efficient operation of the apparatus is possible.

With a high flow speed of the medium to be separated, the formation of such blockages and cloggings are prevented, but then there is a high energy requirement for the pumps. A dead end operation on the other hand consumes little pumping energy, but requires regular interruption of the operation for the cleaning of the apparatus. In order to prevent blockages during semi-cross-flow operation, the apparatus preferably also includes means for admitting air thereto. Air is admitted at given time intervals, preferably timed in intervals of, for example, 6 seconds and for a period of about 1 second. In this way, the subsequent air pulses generate pulsed forces which can remove particles or particle layers deposited on the membrane surfaces. In addition, the air pulses cause some turbulence in the medium to be separated whereby the separation capability of the membrane elements is further enhanced. In this respect, it is advantageous that the membrane elements which are supported in the apparatus only at one of their ends are able to move laterally in the medium flow.

It is finally advantageous if the housing includes a cover or connecting structure at least at the end where the medium to be separated is admitted which cover seals the housing. It is pointed out that such a cover is not necessary for the intended operation of the apparatus. The cover may therefore be of a design which depends on the design of the apparatus and the cross-section of the housing. Because of the relatively small pressure of the medium to be separated as compared to the ambient pressure, the connecting structure may be mounted using simple sealing means such as a circumferential O-ring of an elastomer material, which is disposed in a circumferential groove formed in the connecting structure and which forms a seal with the housing when the connecting structure is mounted to the housing. The connecting structure may be removably fixed to the housing by a securing ring formed like a Seegar ring which extends into an inner circumferential groove formed in the housing.

The connecting structure preferably also includes a permeant outlet which can be connected to a pipe in a pressure-tight manner. A passage for the medium to be separated arranged for example centrally in the connecting element provides for good distribution of the medium to be separated over the closure element so that the medium is uniformly distributed through the passages in the closure element to the flow channels between the membrane elements.

It is finally possible to arrange a plurality of apparatus of the type referred to above in a series, one after another, in a common housing which is also available as semi-finished product. Such a series arrangement has the advantage that the individual apparatus can be relatively short whereby the pressure losses in the flow passages at the permeant side which have very small flow cross-sections are small in each unit.

The membrane elements are preferably closed at their free ends which are freely movable in the flowing medium. In this way, the formation of blockages is almost impossible and the stripping of fibrous or hair-like particle contained in the medium to be separated is facilitated.

The apparatus is preferably also operable with pressure on the medium side and or vacuum at the permeant side and such operations can be performed with dead end flow arrangements, cross-flow arrangements or semi-cross-flow arrangements.

Below, an embodiment of the invention will be described in greater detail on the basis of the accompanying drawings.

DESCRIPTION OF PREFERRED EMBODIMENTS

Figure 1A:
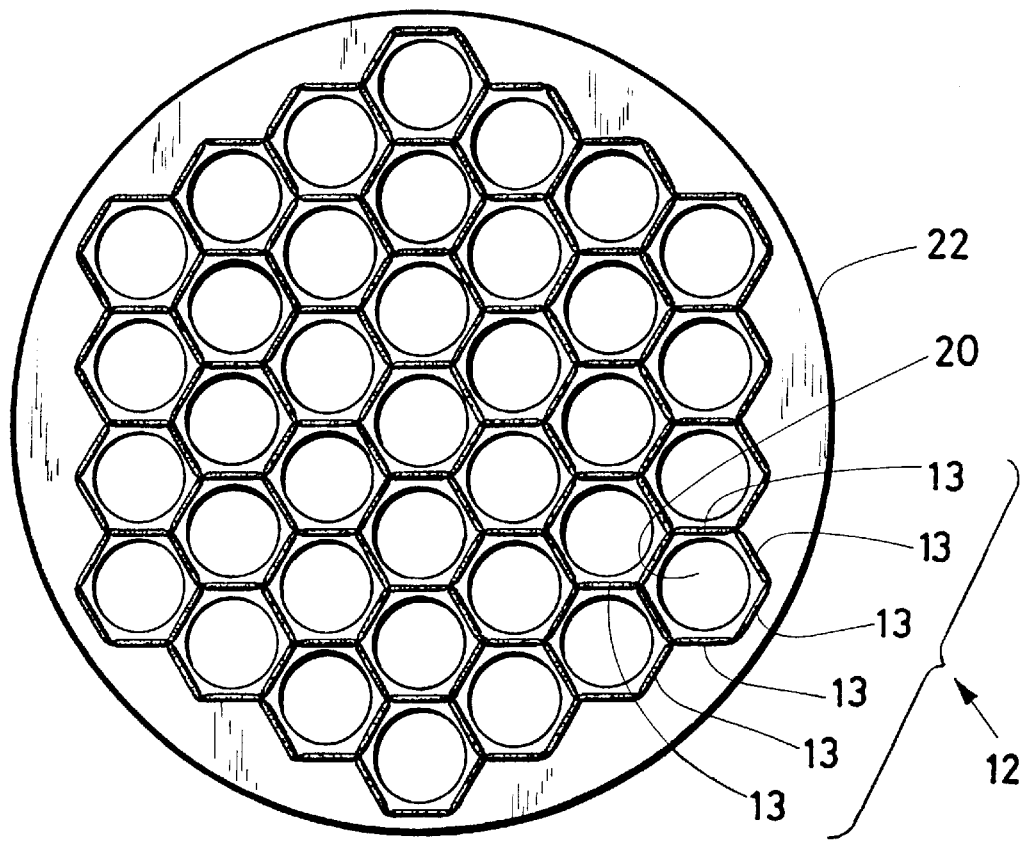
FIG. 1a shows a membrane arrangement including pillow membrane structures disposed on the closure element wherein 6 pillow membrane structures form a flow channel.
Figure 1B:
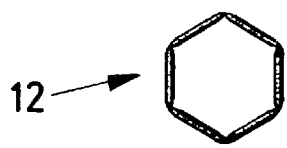
FIG. 1b shows a flow channel formed by 6 separate pillow membranes disposed around the flow channel.
Figure 2A:
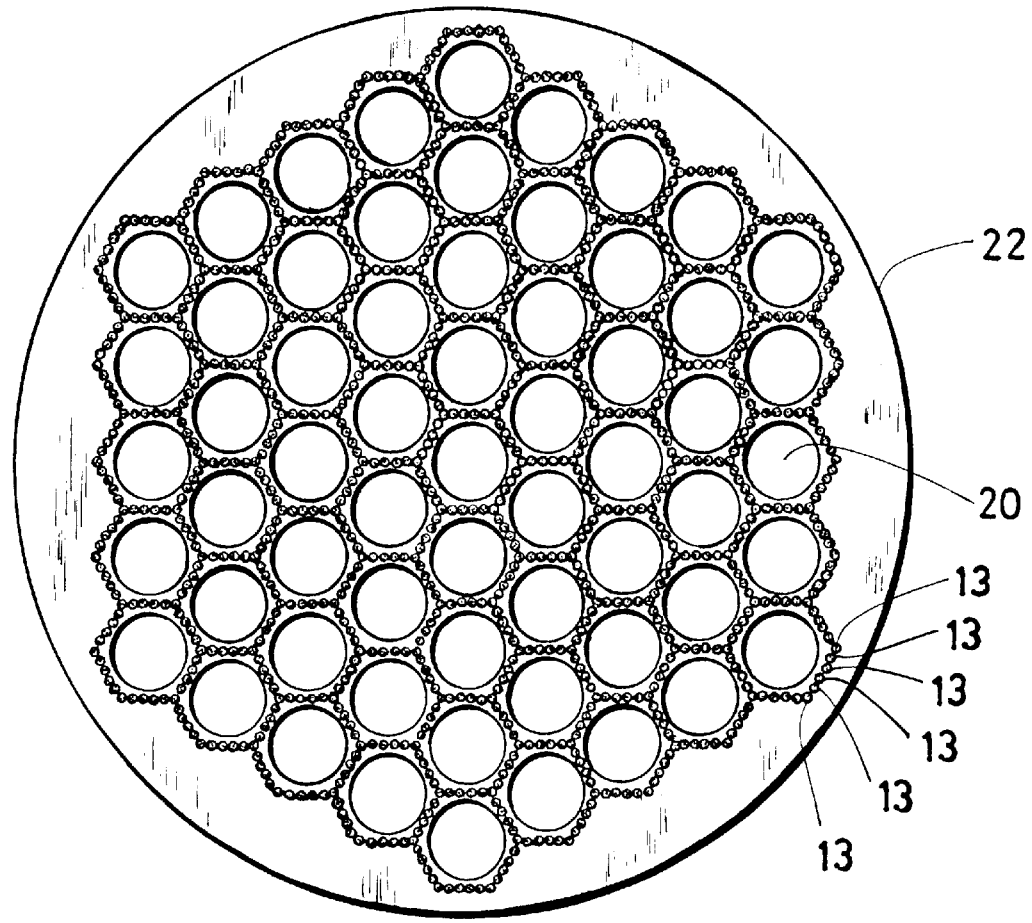
FIG. 2a shows a membrane arrangement utilizing hollow fiber membranes mounted to the closure element and defining together flow channels.
Figure 2B:
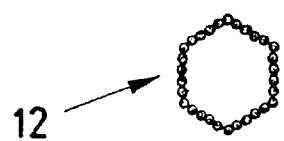
FIG. 2b shows the hollow fiber membranes in a hexagonal arrangement defining a hexagonal flow channel.

An apparatus 10 for the separation of liquid media 11 (FIG. 5) including foreign substances, particularly municipal and commercial waste waters, comprises a plurality of membrane separating structures 12 which themselves are formed by a plurality of membrane elements 13 (see FIGS. 1a, 1b, 2a, 2b, and 4b). As it is common in the separation of substances by membrane elements 13, the medium 11 to be separated which is generally called "feed" is supplied to the entrance end of the membrane separating structures 12. Because of the selectivity of the membrane element 13 employed the medium 11 partially permeates through the membrane while the solids and other substances barred by the membrane remain on the liquid medium admission side, that is, the retent side of the membrane. The solids and other substances, the retent, are then, dependent on the operating procedure, either continuously (during cross-flow or semi-cross-flow operation) or discontinuously (during dead end operation) removed from the apparatus 10 in a concentrated form for further treatment. The permeant 17 is collected and is also removed from the apparatus 10 by way of a permeant outlet 18. This physical mechanism is well known in the art and is therefore not further described.

The apparatus 10 comprises a housing 21 which is shown in the drawings to be tubular and which is commercially readily available. It can be cut to any desired length. Since the apparatus 10 is operated at only a small excess pressure, with respect to the pressure of the ambient 23 of the apparatus 10, the housing 21 may consist of any suitable plastic material, but also of metal if desired.

On the housing 21, a closure element 22 is removably mounted (see FIGS. 5 and 7) on which the individual membrane elements are supported. The closure element 22 consists, in the arrangement as described herein, of two parts; a support part 222 for supporting the membrane elements 13 and a flow admission part 223, in which first sections of passages 221 are formed which extend through the closure element 22 (shown in FIG. 6) from the upstream end of the closure element. It is known in the art how for example hollow fiber membrane type membrane elements 13 can be mounted in a closure element 22 which generally consists of a castable resin or plastic material and it is also known how, after the introduction and curing of the resin, the needed permeant discharge openings 131 are formed. In principle, the membrane elements 13 formed by the pillow membranes can be mounted on the closure element 22 or, respectively, the support part 222 of the closure element 22 in the same manner. Consequently, there is, in principle, no difference between the mounting of the membrane elements 13 on the closure element in the form of hollow fiber membranes or membrane pillows. This is in principle also true for the membrane elements 13 which have only a one-sided membrane layer. They are single layered with respect to their separation-active layer.

Figure 3:
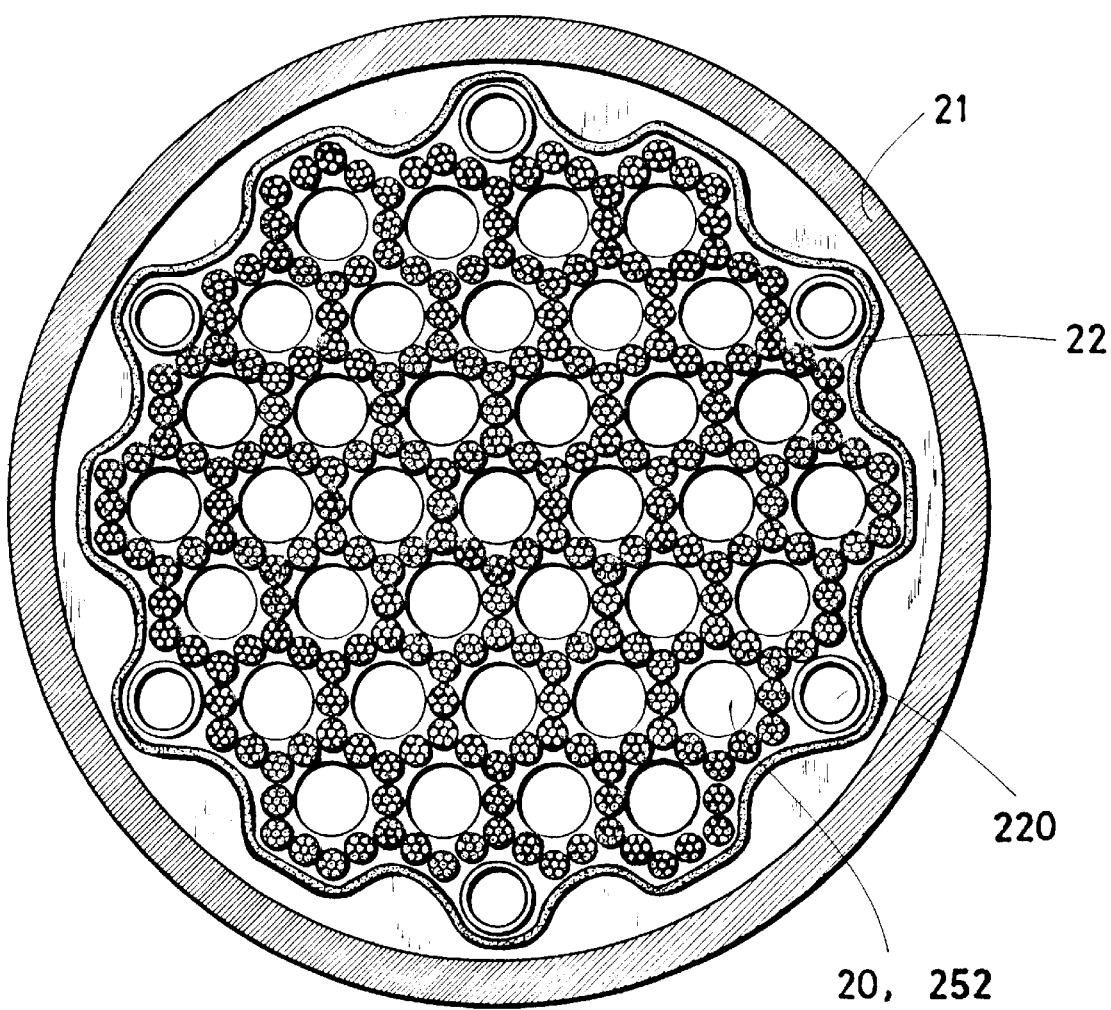
FIG. 3 is a cross-sectional view of an arrangement utilizing hollow fiber membrane clusters to form flow channels.
Figure 4A:
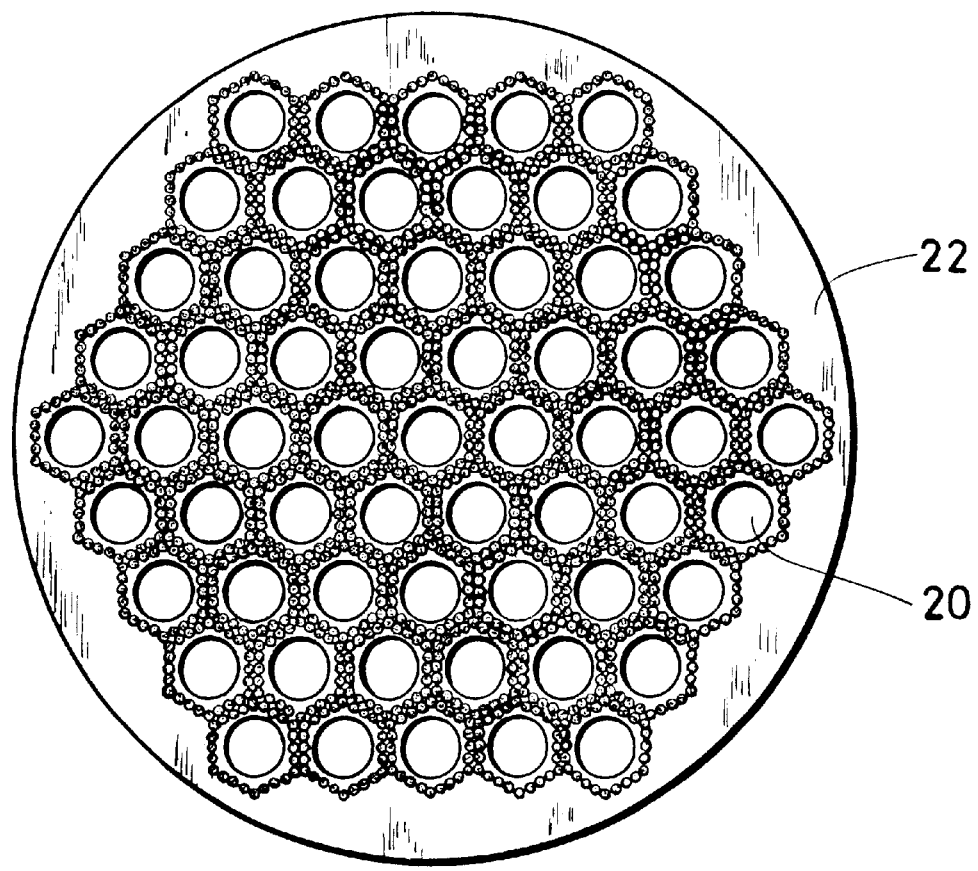
FIG. 4a shows another arrangement of hollow fiber membranes.
Figure 4B:
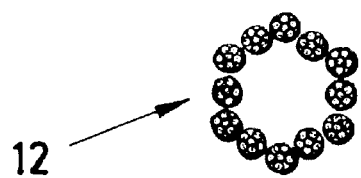
FIG. 4b shows clustered hollow fiber membranes arranged such that, together, they form a hexagonal flow channel.
Figure 5:
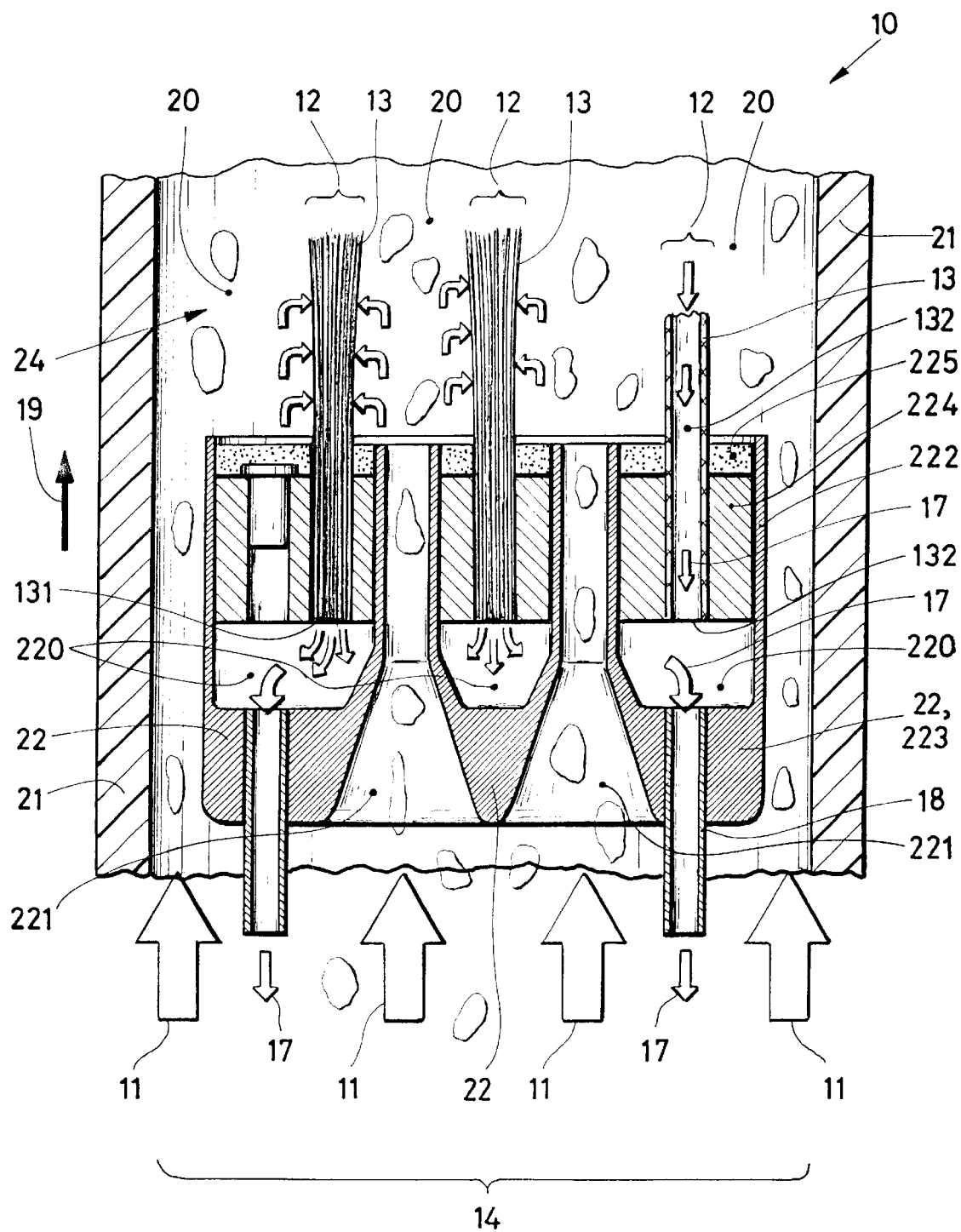
FIG. 5 is a partial cross-sectional view of the apparatus in the area of the closure element where the membranes are mounted.
Figure 6:
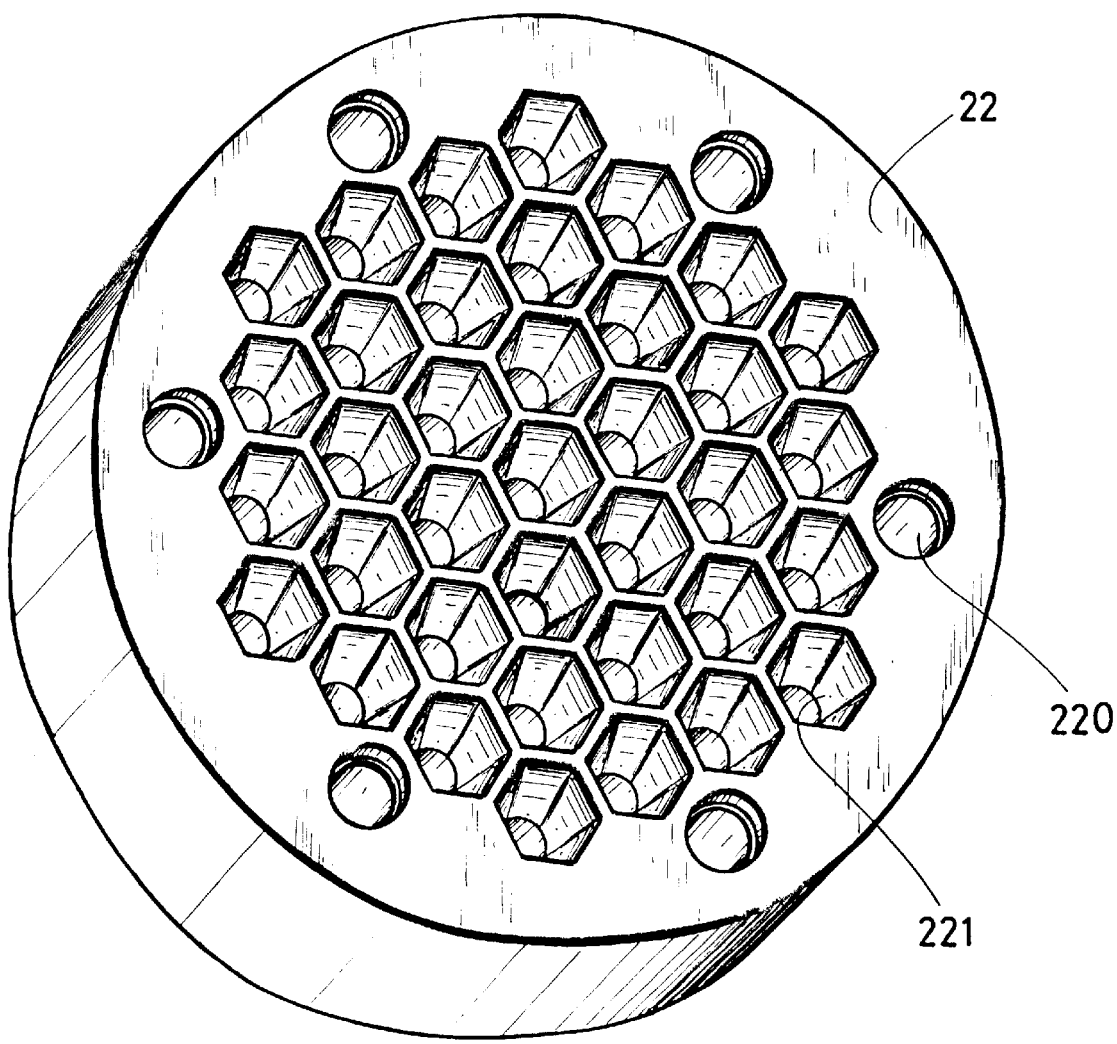
FIG. 6 is a perspective view of the closure element.

The closure element 22 as shown in FIG. 5 is mounted in the housing, not in a pressure tight manner in order to leave some clearance to make sure that the medium 11 can flow into and through the interior space 24 of the housing 21 also in the outer areas of the closure element 22 and around the membrane elements 13 arranged in that area. This provides, in cross-section, for a meander shape of the closure element 22 as shown in FIG. 3. The outer circumference may also be circular to simplify the arrangement. The closure element 22 further includes a permeant collection space 220 which receives the permeant leaving the membrane elements 13 through the permeant discharge openings 131. The permeant collection space 220 also receives, by way of the connecting line 132, the collected permeant volume flow from the closure elements which are arranged in series in the direction to the retent side of the apparatus 10. The closure element 22 additionally includes permeant outlets 18 by way of which the permeant 17 collected in the permeant collecting chamber 220 is discharged. The closure element 22 also includes the earlier mentioned passages 221. The passages 221 extend through the closure element 22 from the ambient 23 to the interior space 24 of the apparatus. In the arrangement as shown, the passages 221 of the apparatus 10 are hexagonal at their outer ends, but are circular at their ends adjacent the interior space 24 (see also the views of the closure element 22 in FIGS. 1a, 2a, 3, and especially FIG. 6, where the transition from a hexagonal cross-section to a circular cross-section is clearly visible). It is however, pointed out that any type of cross-sectional shape may be used for the passages depending on the design of the apparatus and also on the type of membrane elements 13 used and also on the medium 11.

As also already mentioned, the closure element 22 consists in the described embodiment of a support part 222 and a flow admission part 223. In the support part 222, the membrane elements 13 are mounted by a hard-elastic joining means 224 for firmly supporting the membrane elements 13 and sealing them with regard to the permeant space. Since the membranes 13 are mounted only at one longitudinal end within the support part 222 of the closure element 22 and are not supported at their opposite ends, they are accordingly radially movable at their other end. The radial mobility however may lead to breakages at their support areas. To prevent such breakage of the membranes, a soft elastic mounting means 225 may be provided by which the membrane elements 13 may be supported in the support part 222 quasi as a final support means. The apparatus 10 further includes an end element 25, which closes the housing 21 at the medium admission end thereof and which has a central passage 250 for the medium 11 to be separated. In addition, the end element 25 includes pipe connections or openings 253 which provide for communication with the permeant outlets of the closure element 22 by way of a number of pipes 255 or only a sing l e pipe 252 (see FIG. 7). It is apparent that the pipe connections are all pressure tight in order to prevent the medium to be separated from mixing with the permeant. The permeant is collected by way of a permeant collection channel 254 into which, within the connecting elements 25, all the pipe connection stubs 253 lead and from which the permeant is conducted to the permeant outlet 251 of the connecting element 25 for use in predetermined areas.

Figure 7:
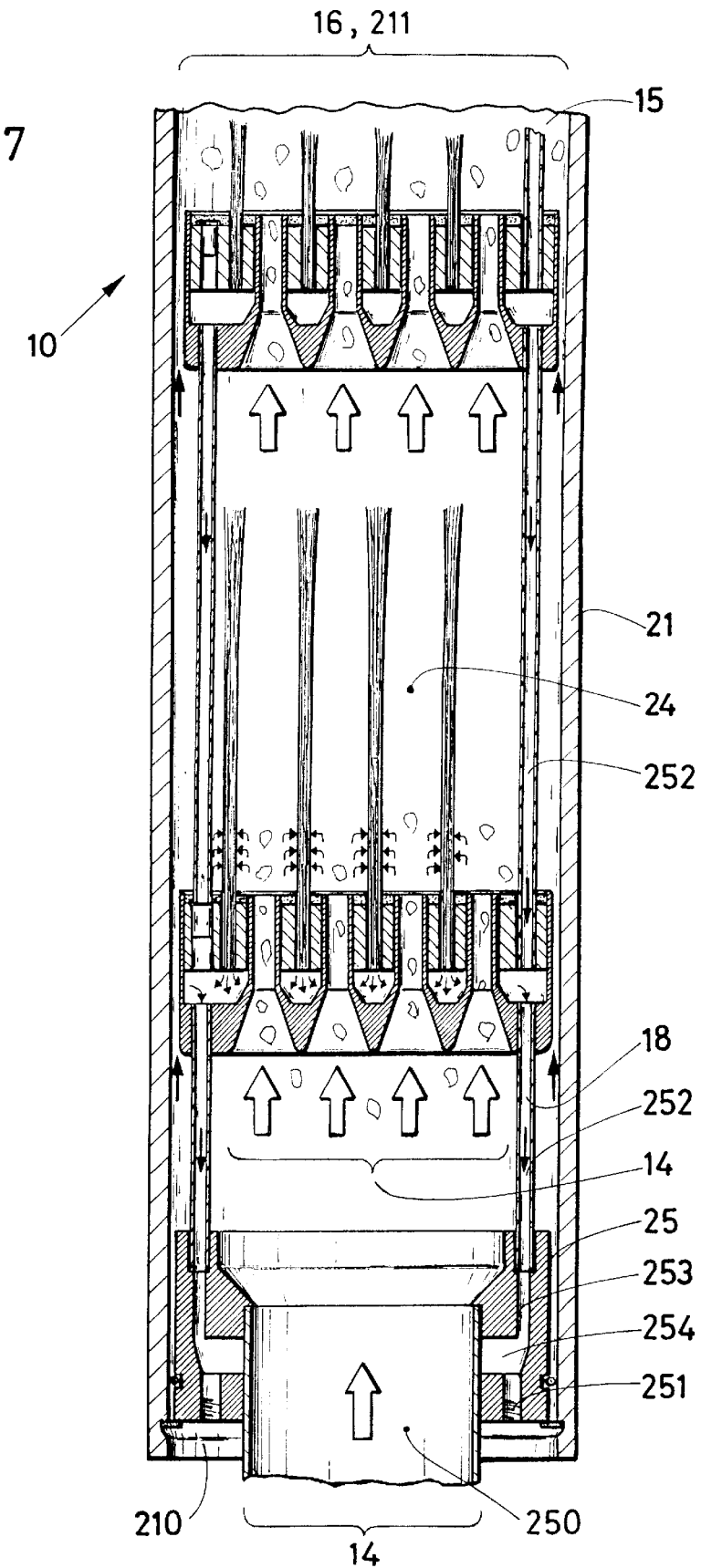
FIG. 7 is a partial cross-sectional view of a housing with two separation apparatus arranged in series.
Figure 8:
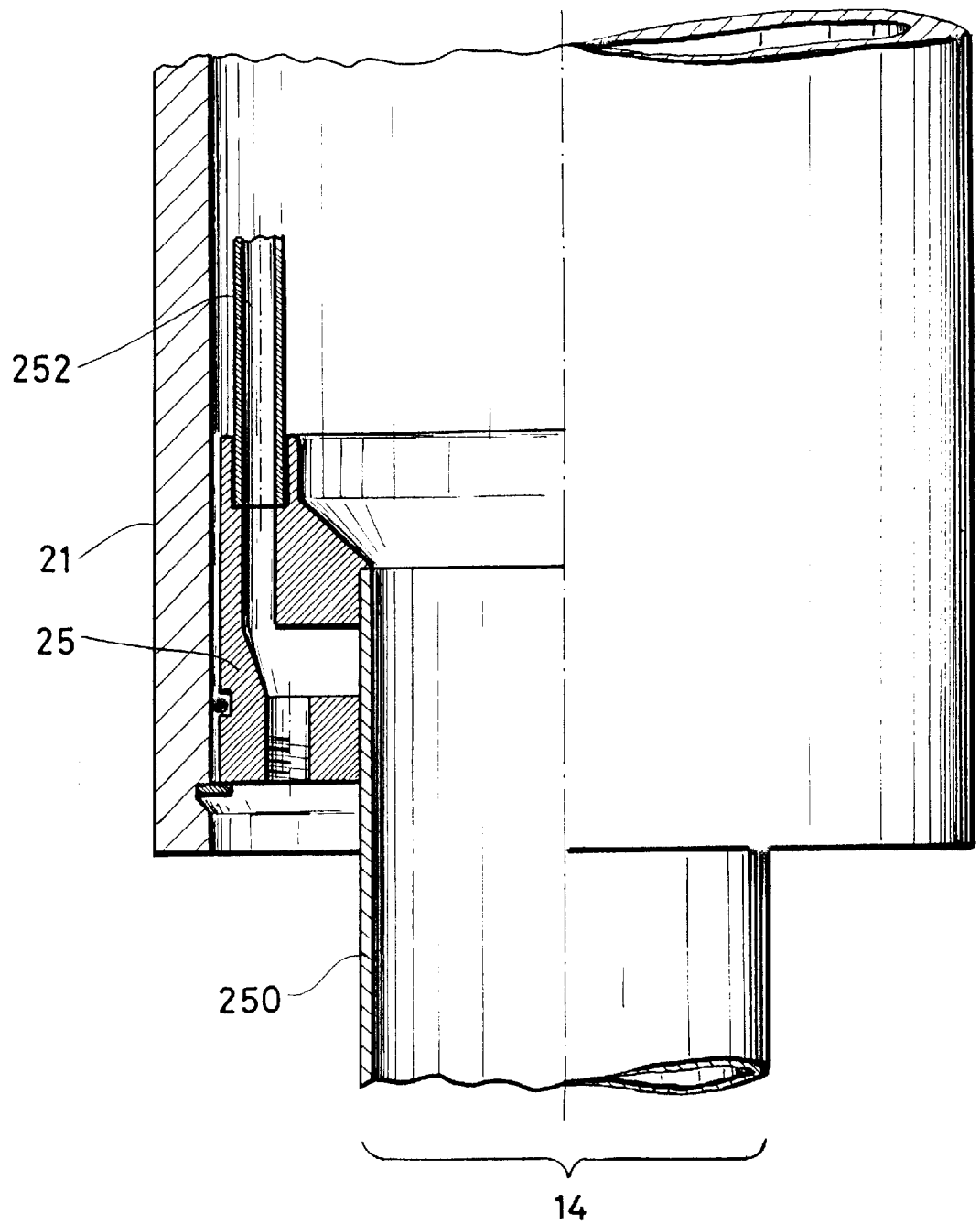
FIG. 8 is a sectional view of only a portion of the housing with the closure element disposed in the housing.

As is shown in FIG. 7, it is possible to provide a plurality of apparatus 10 in a housing 21 in a series arrangement, one after another, only two such apparatus 10 being shown in the series arrangement of FIG. 7. Depending on the field of application, in other arrangements more apparatus can be disposed in a single housing. The average length of the membrane elements 13 in a longitudinal direction of the apparatus 10 or in a longitudinal direction of the housing 21 is in the range of 40 to 2000 mm.

As already mentioned, during operation of the apparatus the pressure of the medium 11 to be separated is raised only slightly above ambient pressure which may be achieved by way of a pump which is arranged in the medium flow and which is not shown in the drawings. The apparatus 10 is then preferably operated in accordance with a "semi-cross-flow" process. In order to prevent blockages of the membrane elements 13 during such an operation of the apparatus or to avoid he formation of a clogging layer on the surfaces of the membrane elements 13 and also to increase the turbulence of the liquid medium 11 to be separated during its flow through the apparatus air is supplied to the interior 24 of the apparatus 10 at certain time intervals. The air may be supplied separately or together with the liquid medium 11. This causes movement of the membrane elements 13 such that any clogging layer on the membrane surfaces is dislodged. It is advantageous to supply the air in a timed manner, for example, in such a way that air is admitted for one second after each 6 second time interval. Each air impulse provides for a new statistic distribution of the air whereby the formation of a certain flow channel in the apparatus 10 is avoided and particular flow channels 20 will not become blocked.

It is also possible to reverse the flow of the permeant, that is, to provide for permeant backflushing of the membrane elements 13 whereby cover layers or other deposits can be removed from the membrane surfaces.

The membrane elements 13 in accordance with the invention form flow channels 20 extending in the flow direction 19 of the medium 21 through the apparatus 10 wherein the membrane elements 13 enclose the flow channels between them. This kind of arrangement in which the formation of the hexagonally cross-sectioned flow channels 20 provides for an optimal contact of the medium 11 to be separated with the membrane elements when the medium 11 flows through the apparatus 10.

What is claimed is:

1. An apparatus for the treatment of liquids including foreign substances, comprising a membrane separating structure having opposite axial ends and including a membrane support element and membrane elements mounted in said membrane support element, said membrane separating structure having an inlet at one axial end for receiving the liquid to be separated and passing it past said membrane elements whereby a permeant portion of said liquid permeates through the membranes of said membrane elements and a retent portion of said liquid is enriched with said foreign substances, an outlet for discharging said permeant portion, and another outlet at the opposite axial end for discharging said retent portion, said membrane elements being arranged so as to form together at least one flow channel extending longitudinally through said apparatus and said membrane support element having flow openings in alignment with said at least one flow channel and adapted to guide said liquid to be treated and said retent portion in a straight line through said flow openings and said flow channel past the membrane elements forming said flow channel and out of said apparatus, repectively.

2. An apparatus according to claim 1, wherein said flow channel has a polygonal cross-section.

3. An apparatus according to claim 2, wherein said flow channel is hexagonal in cross-section.

4. An apparatus according to claim 1, wherein said flow channel is essentially circular in cross-section.

5. An apparatus according to claim 1, wherein said membrane elements are pillow type or pocket type membranes.

6. An apparatus according to claim 1, wherein said membrane elements are hollow fiber membranes.

7. An apparatus according to claim 1, wherein said apparatus includes a housing in which said membrane elements are disposed.

8. An apparatus according to claim 7, wherein said membrane elements have permeant discharge openings and said membrane support element is a closure element which is removably supported in said housing and on which said membrane elements are supported by their discharge openings.

9. An apparatus according to claim 8, wherein said closure element includes a permeant discharge passage to which the permeant which leaves the membrane elements through their discharge openings is conducted for discharge through said permeant discharge passage.

10. An apparatus according to claim 8, wherein said closure element consists of a support part for supporting said membrane elements and an admission part connected to said support part for the admission of said liquid to be separated.

11. An apparatus according to claim 10, wherein said membrane elements are mounted in said support part by a basic mounting means consisting of a hard-elastic connecting structure and a soft-elastic connecting means providing for some movability of said membrane elements in the interior of said housing.

12. An apparatus according to claim 8, wherein said housing is provided at least at a liquid supply side with a connecting element sealing said housing and having at least one passage for the liquid to be separated.

13. An apparatus according to claim 12, wherein said connecting element includes at least one permeant outlet which is in communication with at least one permeant outlet formed in said closure element.

14. An apparatus according to claim 8, wherein said membrane elements are closed at free ends thereof remote from open ends thereof by which they are supported.

15. An apparatus according to claim 14, wherein said membrane elements are freely movable in said liquid at their free ends.

16. An apparatus according to claim 1, wherein said liquid to be separated is pumped through said apparatus in a semi-cross-flow process.

17. An apparatus according to claim 1, wherein means are provided for admitting air to said apparatus in a timed fashion.

18. An apparatus according to claim 1, wherein a plurality of said apparatus are included in a housing and are arranged in series, one after another.

19. An apparatus according to claim 1, wherein said membrane elements are operable with at least one of excess pressure upstream or said elements and vacuum downstream of said elements.

* * * * *